United States Patent
Park et al.

(10) Patent No.: US 9,618,761 B2
(45) Date of Patent: Apr. 11, 2017

(54) VISION SYSTEM, ALIGNMENT SYSTEM FOR ALIGNING DISPLAY PANEL AND PATTERNED RETARDER ON STEREOSCOPIC IMAGE DISPLAY USING THE VISION SYSTEM

(75) Inventors: Wonki Park, Paju-si (KR); Mikyung Park, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 1357 days.

(21) Appl. No.: 13/333,182

(22) Filed: Dec. 21, 2011

(65) Prior Publication Data

US 2012/0162399 A1 Jun. 28, 2012

(30) Foreign Application Priority Data

Dec. 22, 2010 (KR) ........................ 10-2010-0132520

(51) Int. Cl.
*H04N 13/04* (2006.01)
*G02B 27/26* (2006.01)

(52) U.S. Cl.
CPC .................................. *G02B 27/26* (2013.01)

(58) Field of Classification Search
CPC G02B 27/26; G02B 27/2278; G02B 27/2214; G06K 9/745; B64D 15/20; G02F 1/133528
USPC ......... 348/54, 135, 57; 340/583; 345/6, 589; 349/18; 359/1
See application file for complete search history.

(56) References Cited

U.S. PATENT DOCUMENTS

| | | | |
|---|---|---|---|
| 3,183,763 A | 5/1965 | Koester | |
| 5,386,317 A | 1/1995 | Corle et al. | |
| 5,481,321 A | 1/1996 | Lipton | |
| 5,838,239 A * | 11/1998 | Stern | B64D 15/20 340/583 |
| 5,850,255 A | 12/1998 | Falk | |
| 6,222,672 B1 * | 4/2001 | Towler | G02B 27/26 348/57 |
| 7,623,279 B1 * | 11/2009 | Ayres | G06K 9/745 359/1 |
| 2001/0040724 A1 | 11/2001 | Costales | |
| 2004/0012851 A1 | 1/2004 | Sato et al. | |
| 2004/0119178 A1 | 6/2004 | Kuwamura | |
| 2008/0143638 A1* | 6/2008 | Kim | G02F 1/133528 345/6 |
| 2009/0290079 A1* | 11/2009 | Evans | G02B 27/2278 349/18 |
| 2009/0310216 A1 | 12/2009 | Roh et al. | |
| 2010/0177113 A1* | 7/2010 | Gay | G02B 27/2214 345/589 |

(Continued)

FOREIGN PATENT DOCUMENTS

| | | |
|---|---|---|
| CN | 1504778 A | 6/2004 |
| CN | 101403701 A | 4/2009 |

(Continued)

*Primary Examiner* — Gims Philippe
*Assistant Examiner* — Richard Carter
(74) *Attorney, Agent, or Firm* — Birch, Stewart, Kolasch & Birch, LLP

(57) ABSTRACT

A vision system for obtaining an image of a patterned retarder comprising first and second patterns having different optical axes is provided. The vision system comprises a camera, a ½ wavelength plate arranged in front of a lens of the camera, a rotatable ¼ wavelength plate arranged in front of the ½ wavelength plate.

9 Claims, 10 Drawing Sheets

(56) References Cited

U.S. PATENT DOCUMENTS

2010/0177417 A1\* 7/2010 Jang ...................... G02B 5/201
                                                        359/891

FOREIGN PATENT DOCUMENTS

| CN | 101604071 A | 12/2009 |
|----|----|----|
| DE | 102009023753 A1 | 1/2010 |
| JP | 2006-275749 A | 10/2006 |
| KR | 10-2008-0038785 A | 5/2008 |

\* cited by examiner

VISION SYSTEM, ALIGNMENT SYSTEM FOR ALIGNING DISPLAY PANEL AND PATTERNED RETARDER ON STEREOSCOPIC IMAGE DISPLAY USING THE VISION SYSTEM

This application claims the priority benefit of Korean Patent Application No. 10-2010-0132520 filed on Dec. 22, 2010, the entire contents of which is incorporated herein by reference for all purposes as if fully set forth herein.

BACKGROUND

Technical Field

The embodiments of this document are directed to a vision system and an alignment system for aligning a display panel and a patterned retarder on a stereoscopic image display using the vision system.

Discussion of the Related Art

Among three-dimensional (3D) displays, a polarization glass-type 3D display includes a patterned retarder on a display panel. The patterned retarder form different polarization for left and right-eyed images displayed on the display panel. Patterned retarders may be implemented as glass patterned retarders (GPRs) or as film patterned retarders (FPRs). A film patterned retarder includes a protection film having random phase differences or optical axes. Upon identifying an aligned state of the patterned retarder based on an image obtained by a vision system capturing patterns of the patterned retarder through the protection film, the patterns in the image may appear to have similar gray tones, which causes it difficult to clearly identify the patterns and boundaries between the patterns.

SUMMARY

The embodiments of this document provide a vision system that may increase recognition accuracy of patterns of a patterned retarder and boundaries between the patterns and an alignment system for aligning a display panel and the patterned retarder on a stereoscopic image display using the vision system According to an embodiment of this document, there is provided a vision system for obtaining an image of a patterned retarder comprising first and second patterns having different optical axes, the vision system comprising a camera, a ½ wavelength plate arranged in front of a lens of the camera, a rotatable ¼ wavelength plate arranged in front of the ½ wavelength plate.

A gear member is provided on a circumferential surface of the rotatable ¼ wavelength plate, and a motor rotating the ¼ wavelength plate.

A gear member of the motor is engaged with the gear member of the ¼ wavelength plate.

According to an embodiment of this document, there is provided a system of aligning a patterned retarder and a display panel of a three dimensional image display apparatus, the system comprising a first alignment stage that supports the patterned retarder including first and second patterns having different optical axes and calibrates a position of the patterned retarder, a first vision system that obtains images of the first and second patterns of the patterned retarder, a second alignment stage that supports the display panel and calibrates a position of the display panel, a second vision system that obtains images of alignment marks provided at edge portions of the display panel, and a drum that receives the patterned retarder from the first alignment stage and attaches the patterned retarder onto the display panel on the second alignment stage.

The first vision system comprises a camera, a ½ wavelength plate arranged in front of a lens of the camera, a rotatable ¼ wavelength plate arranged in front of the ½ wavelength plate, wherein a gear member is provided on a circumferential surface of the rotatable ¼ wavelength plate, and a motor rotating the ¼ wavelength plate.

BRIEF DESCRIPTION OF THE DRAWINGS

The accompanying drawings, which are included to provide a further understanding of this document and are incorporated in and constitute a part of this specification, illustrate embodiments of this document and together with the description serve to explain the principles of this document. In the drawings.

DETAILED DESCRIPTION OF THE EMBODIMENTS

Figure 1A:
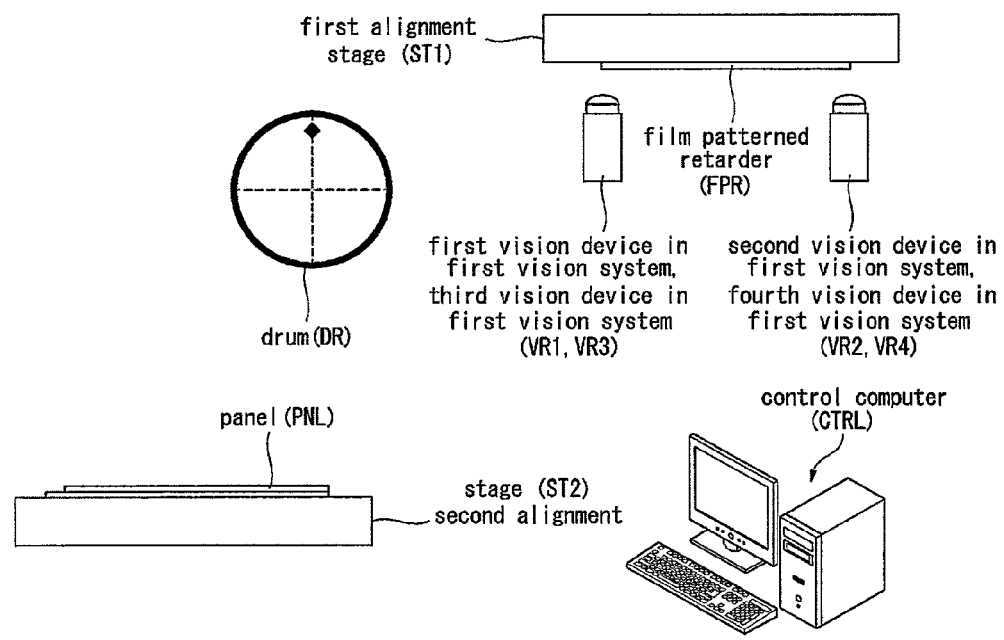
FIGS. 1A to 1D are views illustrating an aligning method using a system of aligning a patterned retarder and a display panel of a stereoscopic image display apparatus according to an embodiment of this document.

Hereinafter, exemplary embodiments of this document will be described with reference to the accompanying drawings, wherein the same reference numerals may be used to denote the same or substantially the same elements throughout the drawings and the specification. The description of well-known functions or structures, which makes the gist of this document unnecessarily unclear or equivocal, will be omitted.

Various embodiments provide a three-dimensional (3D) display, e.g. a polarization glass-type 3D display which may include a patterned retarder on a display panel. The patterned retarder may form different polarization for left and right-eyed images displayed on the display panel. Patterned retarders may be implemented as glass patterned retarders (GPRs) or a film patterned retarders (FPRs).

FIGS. 1A to 1D are views illustrating an aligning method using a system of aligning a patterned retarder and a display panel of a stereoscopic image display apparatus according to an embodiment of this document.

Referring to FIGS. 1A to 1D, an alignment system according to an embodiment includes a first alignment stage ST1, a first vision system VR1 to VR4, a second alignment stage ST2, a second vision system VP1 to VP4, a drum DR, and a control computer CTRL.

Figure 3:
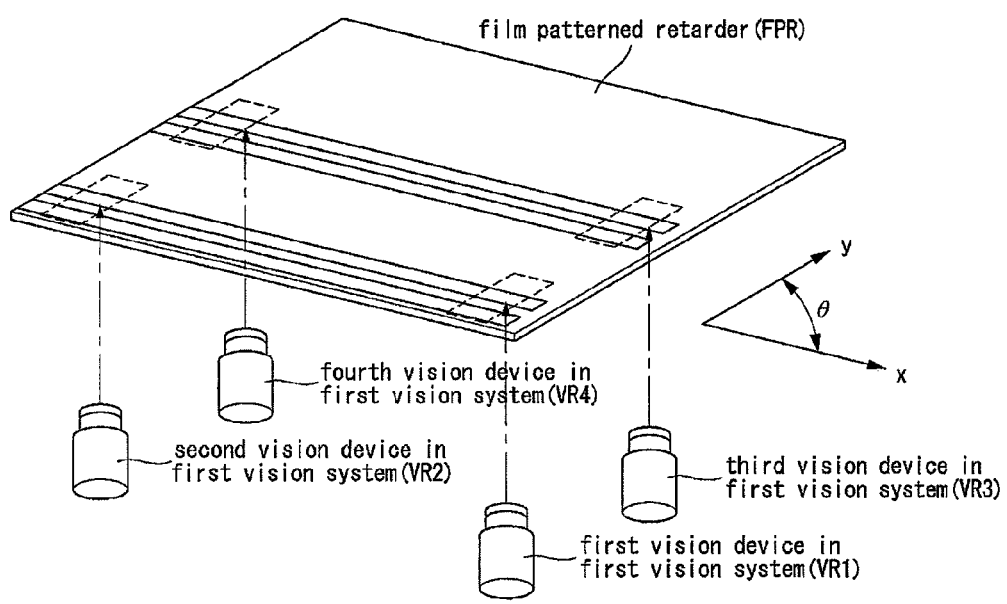
FIG. 3 is a perspective view illustrating a patterned retarder and a first vision system according to an embodiment of this document.

The first alignment stage ST1 attaches a film patterned retarder FPR and adjusts a position of the film patterned retarder FPR in the directions of x, y, and θ axes under control of the control computer CTRL as shown in FIG. 3, thus calibrating an aligned state of the film patterned retarder FPR. The first vision system VR1 to VR4 captures four edge portions of the film patterned retarder fixed onto the first alignment stage ST1 to obtain images, and transmits the obtained images to the control computer CTRL.

Figure 2:
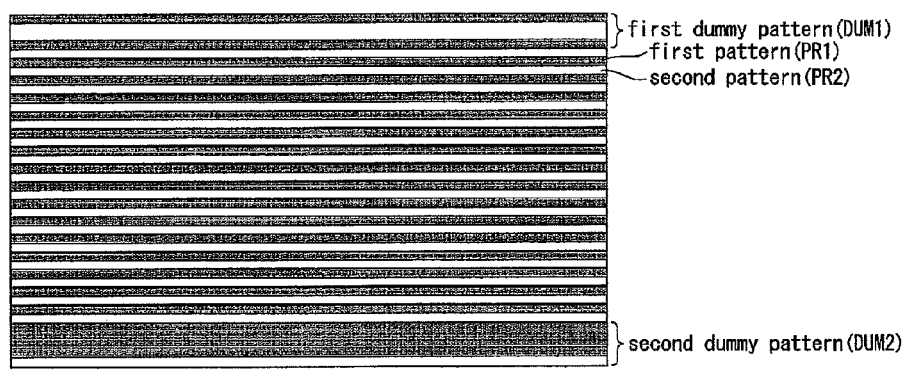
FIG. 2 is a plan view illustrating a structure of the patterned retarder shown in FIGS. 1A to 1D.

As shown in FIG. 2, the film patterned retarder FPR includes first and second patterns PR1 and PR2 for separating polarization light beams for left-eye images and polarization light beams for right-eye images and dummy patterns DUM1 and DUM2 at upper and lower portions of the first and second patterns PR1 and PR2. The first and second patterns PR1 and PR2 have different optical axes. For example, the optical axes of the first and second patterns PR1 and PR2 are perpendicular to each other. The first and second patterns PR1 and PR2 have different polarization characteristics. The first and second patterns PR1 and PR2 separate polarization light beams for left and right eye images displayed on a display panel PNL. For example, the first pattern PR1 delays phases of line polarization light beams incident from odd-numbered lines in a pixel array of the display panel PNL by ¼ wavelength and converts the polarization light beams for left eye images (or right eye images) displayed on the odd-numbered lines of the display panel into left-hand circular polarization light beams. The second pattern PR2 delays phases of line polarization light beams incident from even-numbered lines in the pixel array of the display panel PNL by −¼ wavelength and converts the polarization light beams for right eye images (or left eye images) displayed on the even-numbered lines of the display panel into left-hand circular polarization light beams.

The dummy patterns DUM1 and DUM2 each have the same polarization characteristics as one of the first and second patterns PR1 and PR2. The upper dummy pattern DUM1 has the same or different polarization characteristics as/from the lower dummy pattern DUM2.

As shown in FIG. 3, the first vision system VR1 to VR4 includes first and second vision devices VR1 and VR2 that obtain images from two edge portions of one of the upper and lower dummy patterns DUM1 and DUM2, and third and fourth vision devices VR3 and VR4 that obtain images from two edge portions of patterns PR1 and PR2 of a central portion of the film patterned retarder FPR.

Figure 4:
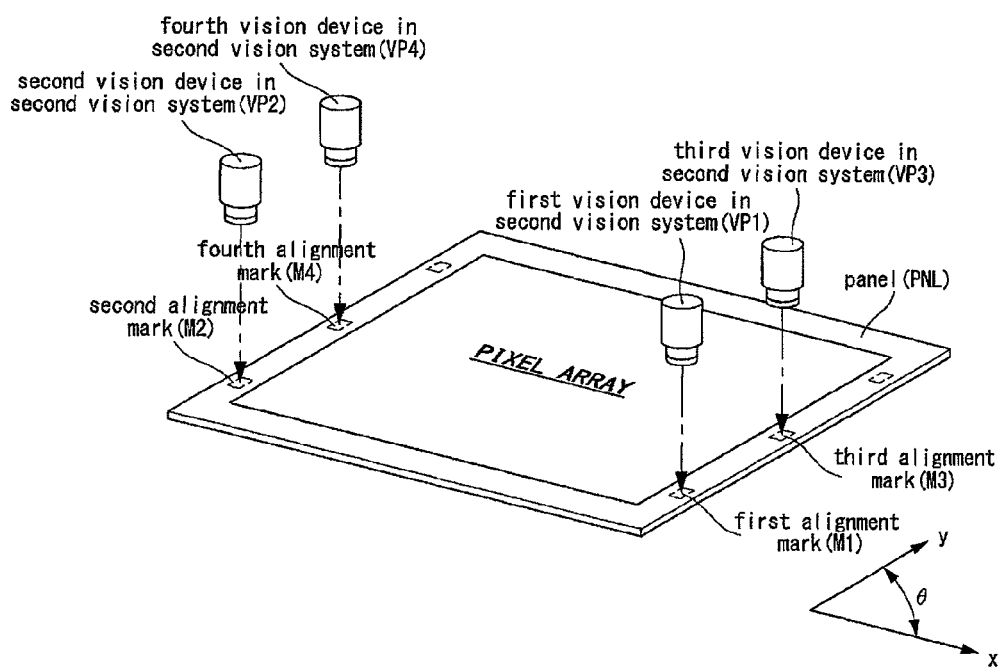
FIG. 4 is a perspective view illustrating a display panel and a second vision system according to an embodiment of this document.

The display panel PNL is seated on the second alignment stage ST2. The second alignment stage ST2 may attach the display panel PNL. The second alignment stage ST2 adjusts a position of the display panel PNL in the directions of x, y, and θ axes under control of the control computer CTRL as shown in FIG. 4, thus calibrating an aligned state of the display panel PNL. The second vision system VP1 to VP4 captures four edge portions of the display panel PNL on the second alignment stage ST2 to obtain images, and transmits the obtained images to the control computer CTRL.

According to an embodiment, the display panel PNL includes a liquid crystal display (LCD), a field emission display (FED), a plasma display panel (PDP), an organic light emitting display (OLED), and an electrophoresis display (EPD). Any other suitable display panel may be provided in alternative embodiments.

As shown in FIG. 4, the second vision system VP1 to VP4 captures images of first to fourth alignment marks M1 to M4 provided at a periphery (non-display area) of the pixel array of the display panel PNL. The second vision system VP1 to VP4 includes first and second vision devices VP1 and VP2 that respectively obtains images of the first and second alignment marks M1 and M2 respectively provided at upper and lower ends of the display panel PNL and third and fourth vision devices VP3 and VP4 that obtain images from the third and fourth alignment marks M3 and M4 respectively provided at two opposite ends of a central portion of the display panel PNL.

The drum DR is provided between the first and second alignment stages ST1 and ST2. The drum DR is rotated by a motor under control of the control computer CTRL, and is moved in upper, lower, left, and right directions by a rectilinear guiding means. The drum DR receives the film patterned retarder FPR aligned under control of the control computer CTRL from the first alignment stage ST1 and attaches the film patterned retarder FPR onto the display panel PNL on the second alignment stage ST2.

The control computer CTRL controls the operation of all the components constituting the alignment system according to a preset program, which may be stored in the control computer CTRL, and controls the overall aligning procedure of the display panel PNL and the film patterned retarder FPR.

A method of aligning the display panel PNL and the film patterned retarder FPR is now described below.

According to an embodiment, as shown in FIG. 1A, the film patterned retarder FPR is fixed on the first alignment stage ST1 and an aligned state of the film patterned retarder FPR is identified through the first vision system VR1 to VR4. The control computer CTRL previously stores distances between the dummy patterns DUM1 and DUM2 and the film patterned retarder FPR. The control computer CTRL identifies positions of the dummy patterns DUM1 and DUM2 based on one of images of the dummy patterns DUM1 and DUM2 obtained from the first vision system VR1 to VR4 and activates the first alignment stage ST1 to conform the patterns PR1 and PR2 located at a center of the film patterned retarder FPR with a central line of the image obtained from the third and fourth vision devices, thus aligning the film patterned retarder FPR at a desired position.

Figure 1B:
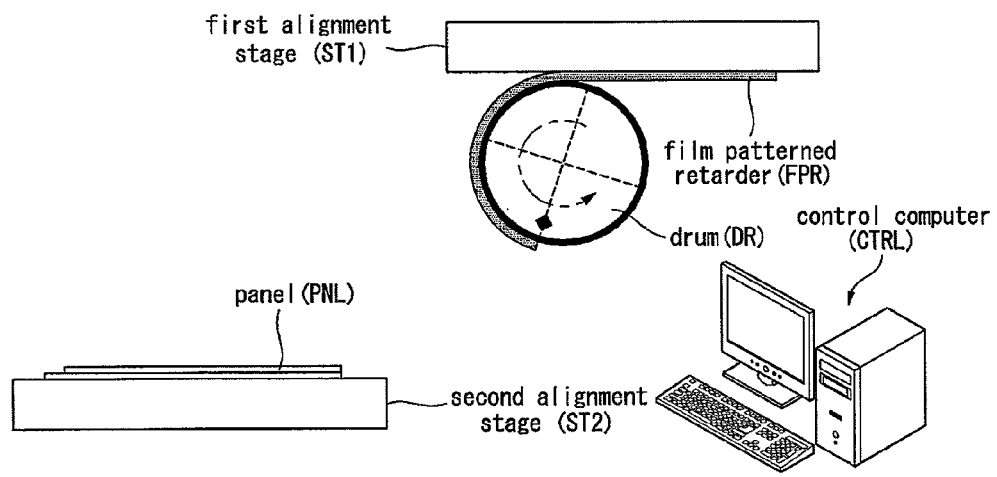

Referring to FIG. 1B, after the film patterned retarder FPR is aligned on the first alignment stage ST1, the drum DR is moved over the first alignment stage ST1 so that the surface of the drum DR is brought in contact with the film patterned retarder FPR. Then, the drum DR is rotated in a direction (e.g. counter-clockwise) such that the film patterned retarder FPR is transferred onto the drum DR. Subsequently, a release film of the film patterned retarder FPR is removed from the drum DR to expose an adhesive of the film patterned retarder FPR. According to an embodiment, the removal of the release film is performed manually or automatically by an automatic remover.

Figure 1C:
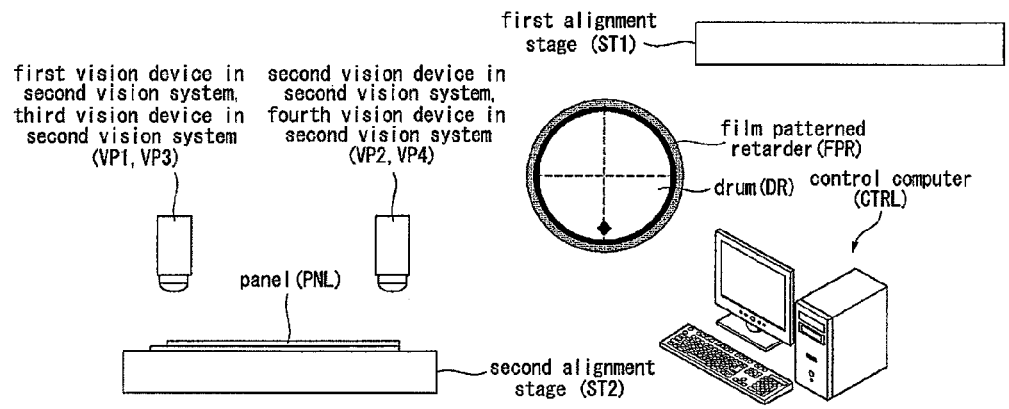
Figure 1D:
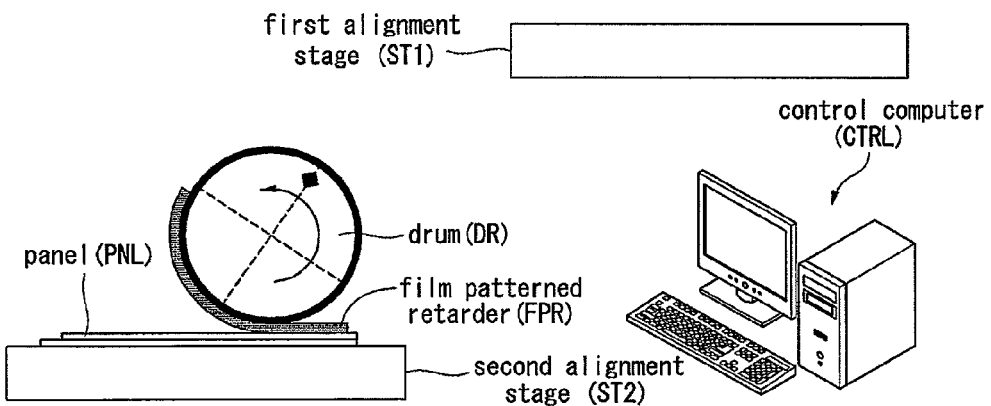

Then, as shown in FIG. 1C, the aligned state of the display panel PNL is identified based on the images of the alignment marks M1 to M4 of the display panel PNL as acquired by the second vision system VP1 to VP4. If there is an error in a position desired by the aligned state of the display panel PNL, the second alignment stage ST2 is activated to calibrate the aligned state of the display panel PNL.

A pre-obtained image of the film patterned retarder FPR and the image of the alignment marks M1 to M4 of the display panel PNL are compared to each other. If the two images conform to each other in their centers, the drum DR is shifted over the second alignment stage ST2 so that the adhesive of the film patterned retarder FPR, which surrounds the drum DR, is brought in contact with the surface of the display panel PNL, and the drum DR is then rotated in a direction (e.g counter-clockwise) such that the film patterned retarder FPR is attached onto the display panel PNL.

Figure 5:
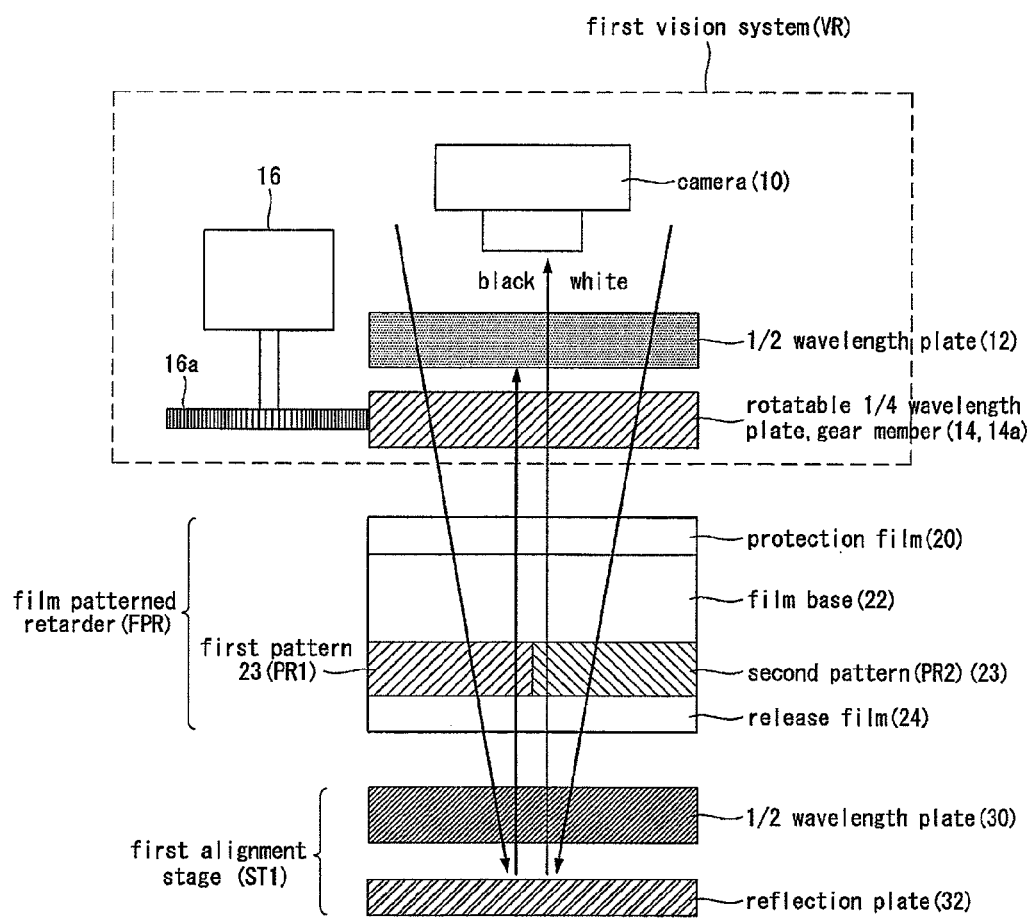
FIG. 5 is a cross sectional view illustrating a structure of a vision system according to an embodiment of this document.

FIG. 5 is a view illustrating a structure of the first vision system VR1 to VR4.

Referring to FIG. 5, each of the vision devices VR1 to VR4, which are collectively denoted as "VR" as well, includes a camera 10, a ½ wavelength plate (or polarization plate) 12, a rotatable ¼ wavelength plate 14 and 14a, and a motor 16 for rotating the ¼ wavelength plate 14 and 14a. The ½ wavelength plate 12 is positioned between a lens of the camera 10 and the ¼ wavelength plate 14 and 14a. The camera 10, the ½ wavelength plate 12, the ¼ wavelength plate 14 and 14a, and the motor 16 are made in a single module. The ½ wavelength plate 12 is arranged in front of a lens of the camera 10. The rotatable ¼ wavelength plate 14 and 14a is arranged in front of the ½ wavelength plate 12. When the vision device VR is shifted under control of the control computer CTRL, the camera 10, the ½ wavelength plate 12, the ¼ wavelength plate 14 and 14a, and the motor 16 are moved together.

The film patterned retarder FPR includes a protection film 20, a film base 22, pattern layers PR1 and PR2, and a release film 24.

The film base 22 functions as a base on which the pattern layers PR1 and PR2 are formed. The film base 22 is formed of a TAC (Triacetyl Cellulose) or acrylic film. The pattern layers PR1 and PR2 include a first pattern PR1 and a second pattern PR2. The pattern layers PR1 and PR2 include dummy patterns DUM1 and DUM2. The first and second patterns PR1 and PR2 and the dummy patterns DUM1 and DUM2 include liquid crystal layers. The liquid crystal layers of the first and second patterns PR1 and PR2 have different alignment angles to have different polarization characteristics. In various embodiments, an angle between the alignment direction of the first pattern PR1 and the alignment direction of the second pattern PR2 may be about or exactly 90°. The protection film 20 includes a polymer resin film that is formed of PET (Poly Ethylene Terephthalate) or a polymer resin having similar characteristics to those of PET. An adhesive is applied on the pattern layers PR1 and PR2 on which the release film 24 is coated.

A surface of the first alignment stage ST1 includes a reflection plate 32 and a ½ wavelength plate 30 disposed on the reflection plate 32. An optical axis of the ½ wavelength plate 30 of the first alignment stage ST1 is perpendicular to an optical axis of the ½ wavelength plate 12 of the vision device VR. When the film patterned retarder FPR is aligned on the first alignment stage ST1, the release film 24 of the film patterned retarder FPR faces the ½ wavelength plate 30 of the first alignment stage ST1, and the protection film 20 of the film patterned retarder FPR faces the ¼ wavelength plate 14 and 14a of the vision device VR.

As the film patterned retarder FPR adhered onto the first alignment stage ST1 is viewed from the vision device VR, the amount of light that is received by the camera 10 and passes through the first pattern PR1 of the film patterned retarder FPR is different from the amount of light that is received by the camera 10 and passes the second pattern PR2. This is why light that passes through the ½ wavelength plate 12 and the ¼ wavelength plate 14 and 14a of the vision device VR, the first pattern PR1 of the film patterned retarder FPR, and the ½ wavelength plate 30 of the first alignment stage ST1 and is reflected by the reflection plate 32 toward the vision device VR is polarized not to pass through the ½ wavelength plate 12 of the vision device VR, and light that passes through the ½ wavelength plate 12 and the ¼ wavelength plate 14 and 14a of the vision device VR, the second pattern PR2 of the film patterned retarder FPR, and the ½ wavelength plate 30 of the first alignment stage ST1 and is reflected by the reflection plate 32 toward the vision device VR is polarized to pass through the ½ wavelength plate 12 of the vision device VR.

Figure 6:
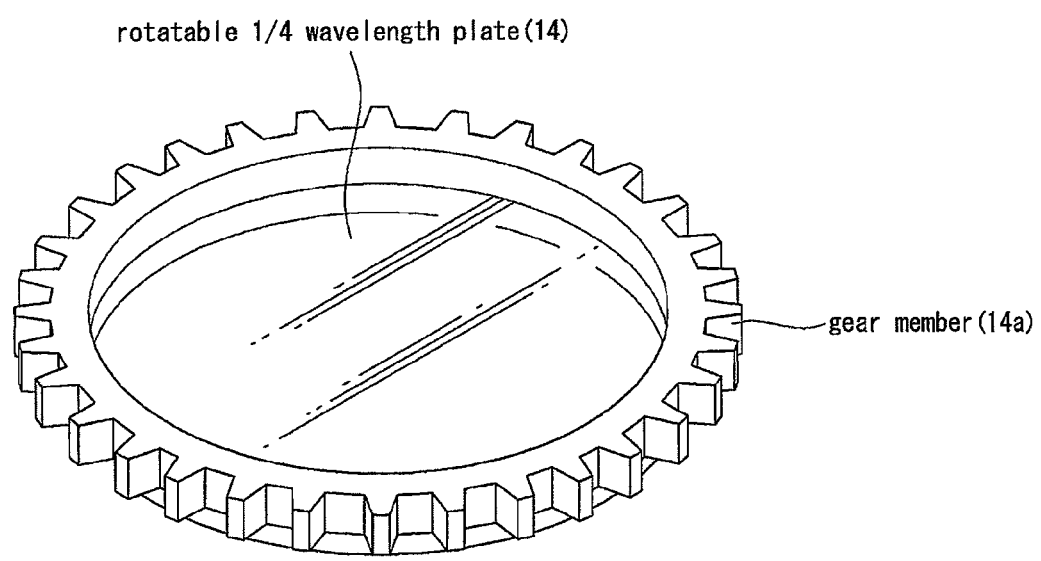
FIG. 6 is a perspective view illustrating the rotatable ¼ wavelength plate shown in FIG. 5.

FIG. 6 is a perspective view illustrating the ¼ wavelength plate 14 and 14a of FIG. 5.

Referring to FIG. 6, the ¼ wavelength plate 14 and 14a of the vision device VR includes a ¼ wavelength plate member 14 and a gear member 14a on a circumferential surface of the ¼ wavelength plate member 14.

The gear member 14a is engaged with a gear member 16a of the motor 16. Accordingly, as the motor 16 rotates, a rotational force of the motor 16 is transferred to the gear member 16a connected to a motor load and to the gear member 14a so that the ¼ wavelength plate 14 and 14a is rotated in an opposite direction of a rotational direction of the motor load.

According to an extension direction of the protection film 20 of the film patterned retarder FPR, the first and second patterns PR1 and PR2 of the film patterned retarder FPR have different contrast ratios in an image obtained by the camera 10 of the vision device VR. Accordingly, the control computer CTRL activates the motor 16 to rotate the ¼ wavelength plate 14 and 14a until the contrast ratios of the first and second patterns PR1 and PR2 of the film patterned retarder FPR become more than a predetermined value in the image obtained by the camera 10 of the vision device.

Without the protection film 20 of the film patterned retarder FPR, there exhibits a large difference between the amount of light that is received by the camera 10 through the first pattern PR1 and the amount of light that is received by the camera 10 through the second pattern PR2. Accordingly, in the absence of the protection film 20, an image obtained by the camera 10 shows a large difference in contrast ratio between the first pattern PR1 and the second pattern PR2, thus rendering the first and second patterns PR1 and PR2 and a boundary between the patterns PR1 and PR2 more clearly recognized.

In the presence of the protection film 20, the brightness of the first and second patterns PR1 and PR2 becomes similar to a gray tone in an image obtained by the camera 10 according to an extension direction of the protection film 20, thus causing it difficult to recognize the patterns PR1 and PR2.

Figure 7:
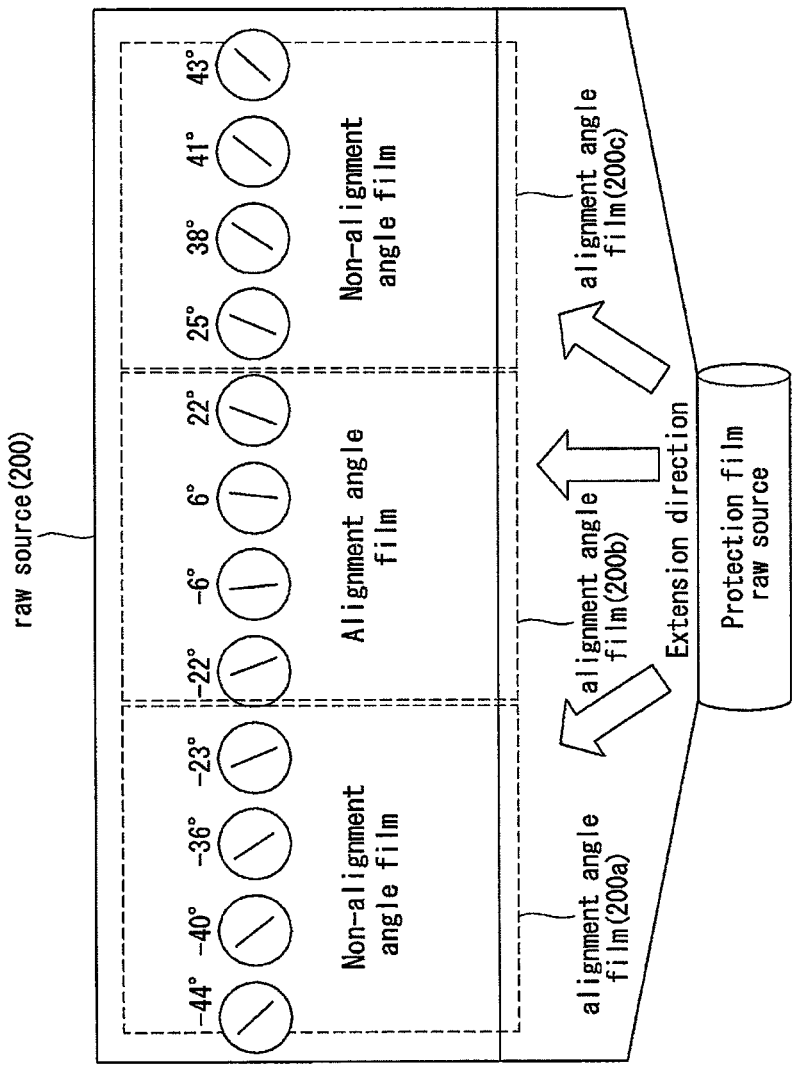
FIG. 7 is a view illustrating a protection film raw source of a film patterned retarder.

As shown in FIG. 7, a raw source 200 for the protection film 20 is extended in various directions so that the area of the raw source 200 is enlarged. The extended raw source 200 is cut into small pieces to cover the film patterned retarder FPR. The raw source 200 has different extension directions according to its position and exhibits different alignment angles of molecules depending on the extension directions.

Figure 8A:
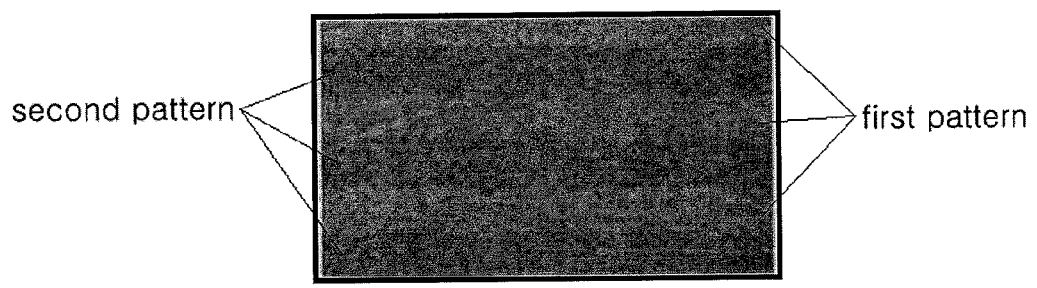
FIGS. 8A to 8C are views illustrating images obtained by a vision system, wherein the images exhibit different contrast ratios depending on extension directions of the protection film raw source of the film patterned retarder shown in FIG. 7.
Figure 8B:
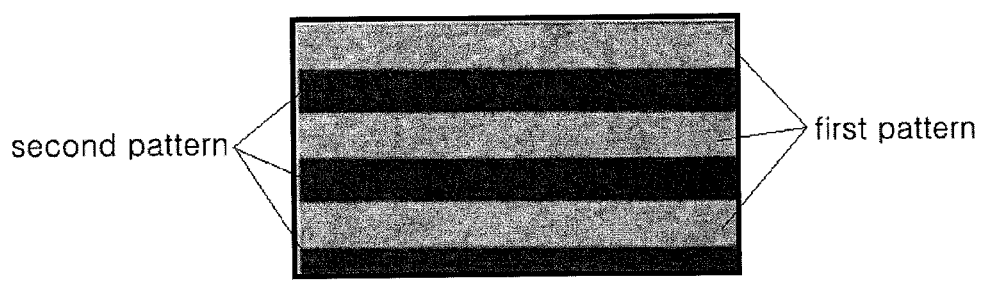
Figure 8C:
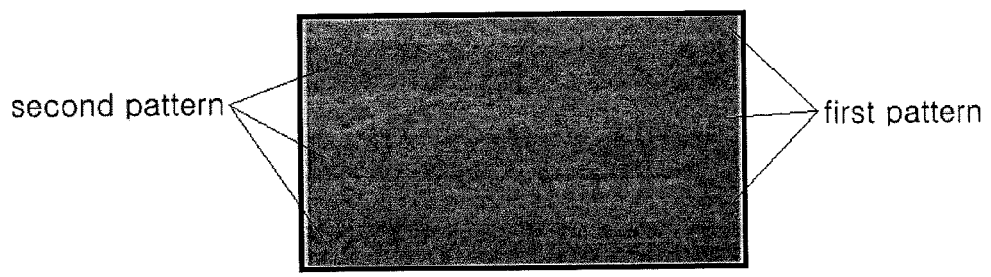

An image obtained by capturing the film patterned retarder FPR to which is applied an alignment angle film 200b which is cut at a central portion of the extended raw source 200 by the camera of the vision device VR shows clear first and second patterns PR1 and PR2 and boundaries between the patterns PR1 and PR2 as shown in FIG. 8B. An image obtained by capturing the film patterned retarder FPR to which is applied an alignment angle film 200a or 200c which is cut at an edge portion of the extended raw source 200 by the camera of the vision device VR shows unclear first and second patterns PR1 and PR2 and boundaries between the patterns PR1 and PR2 since the first and second patterns PR1 and PR2 have gray tones similar to each other.

If the patterns PR1 and PR2 of the film patterned retarder FPR have low contrast ratios and thus show vague boundaries between the patterns PR1 and PR2, the control computer CTRL activates the motor 16 to rotate the ¼ wavelength plate 14 and 14a until the contrast ratios of the patterns PR1 and PR2 becomes more than a predetermined value in the image of the film patterned retarder FPR obtained by the vision device VR. When the extension direction of the protection film 20 conforms to an optical axis of the ¼ wavelength plate 14 and 14a, the contrast ratios of the patterns PR1 and PR2 have maximum values in the image of the film patterned retarder FPR obtained by the vision device VR. Accordingly, the embodiments of this document precisely determine the aligned state of the film patterned retarder FPR without respect to the extension direction of the protection film 20 to increase accuracy of recognition of the patterns PR1 and PR2 and boundaries between the patterns PR1 and PR2.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vision system for obtaining an image of a patterned retarder comprising first and second patterns having different optical axes, the vision system comprising:
    a camera;
    a ½ wavelength plate arranged in front of a lens of the camera;
    a rotatable ¼ wavelength plate arranged in front of the ½ wavelength plate, wherein a gear member is provided on a circumferential surface of the rotatable ¼ wavelength plate;
    and a dummy pattern including a first dummy pattern and a second dummy pattern being disposed at upper and lower portions of the first and second patterns,
    wherein the first and second patterns and the dummy pattern are formed on a same film base, and
    wherein the first and second patterns are disposed alternately and have different optical axes.

2. The vision system of claim 1, further comprising: a motor configured to rotate the rotatable ¼ wavelength plate.

3. The vision system of claim 2, wherein the motor comprises a gear member configured to engage with the gear member of the rotatable ¼ wavelength plate to rotate the rotatable ¼ wavelength plate.

4. The vision system of claim 1, wherein the patterned retarder is disposed under the rotatable ¼ wavelength plate.

5. The vision system of claim 1, wherein the patterned retarder comprises:
    the film base, wherein a pattern layer is formed on a first surface of the film base and includes the first and second patterns,
    a release film covering an adhesive applied on the pattern layer, and
    a protection film covering a second surface of the film base, wherein the second surface is opposite to the first surface of the film base, and wherein the protection film faces the rotatable ¼ wavelength plate.

6. The vision system of claim 1, wherein the dummy pattern has the same polarization characteristic as one of the first and second patterns.

7. The vision system of claim 5, further comprising: an alignment stage that supports the patterned retarder, adjusts a position of the patterned retarder in directions of x, y, and θ axes, and calibrates an aligned state of the patterned retarder.

8. The vision system of claim 7, wherein the alignment stage comprises: a reflection plate, and a ½ wavelength plate on the reflection plate, wherein the ½ wavelength plate of the alignment stage faces the release film of the patterned retarder.

9. The vision system of claim 2, further comprising: a control computer configured to activate the motor until a contrast ratio between the first and second patterns becomes more than a predetermined value in an image obtained by the camera.

* * * * *